United States Patent
Fries et al.

(10) Patent No.: US 9,016,462 B2
(45) Date of Patent: Apr. 28, 2015

(54) FLIP-ABLE V-PLOW BELT CLEANER

(71) Applicant: ASGCO Manufacturing, Inc., Allentown, PA (US)

(72) Inventors: James Edward Fries, Allentown, PA (US); Aaron T. Gibbs, Easton, PA (US)

(73) Assignee: ASGCO Manufacturing, Inc., Allentown, PA (US)

( * ) Notice: Subject to any disclaimer, the term of this patent is extended or adjusted under 35 U.S.C. 154(b) by 0 days.

(21) Appl. No.: 13/888,893

(22) Filed: May 7, 2013

(65) Prior Publication Data

US 2013/0299311 A1    Nov. 14, 2013

Related U.S. Application Data

(60) Provisional application No. 61/644,115, filed on May 8, 2012.

(51) Int. Cl.
B65G 45/16    (2006.01)
B65G 45/12    (2006.01)

(52) U.S. Cl.
CPC .............. *B65G 45/16* (2013.01); *B65G 45/12* (2013.01)

(58) Field of Classification Search
CPC ......... B65G 45/12; B65G 45/14; B65G 45/16
USPC ......................................... 198/497, 498, 499
See application file for complete search history.

(56) References Cited

U.S. PATENT DOCUMENTS

| 3,865,232 | A | 2/1975 | Koenig et al. |
| 4,944,386 | A * | 7/1990 | Swinderman ................. 198/499 |
| 5,222,588 | A | 6/1993 | Gordon |
| 5,875,881 | A | 3/1999 | Brink |
| 6,152,290 | A | 11/2000 | Mott et al. |
| 6,820,734 | B1 * | 11/2004 | Gilbert et al. ................. 198/499 |
| 7,584,835 | B2 * | 9/2009 | Wimsatt et al. ............... 198/497 |
| 2009/0078538 | A1 | 3/2009 | Swinderman et al. |

FOREIGN PATENT DOCUMENTS

| CN | 201427793 Y | * | 3/2010 |
| CN | 201849924 U | * | 6/2011 |
| CN | 202864338 U | * | 4/2013 |
| JP | 2012192992 A | * | 10/2012 |

* cited by examiner

OTHER PUBLICATIONS

International Search Report for corresponding PCT Application No. PCT/US2013/039836, dated Aug. 7, 2013.

*Primary Examiner* — Leslie A Nicholson, III
(74) *Attorney, Agent, or Firm* — Caesar, Rivise, Bernstein, Cohen & Pokotilow, Ltd.

(57) ABSTRACT

A V-plow belt cleaner has a cleaning element providing first and second opposing cleaning edges which can be flipped over so that the second cleaning edge is adjacent the conveyor belt; and reconnecting the V-plow belt cleaner to its mount. The flip-able V-plow belt cleaner may comprise: left and right arms defining an apex and providing a mounting interface for cleaning media; a front arm holder attached proximate the apex; a rear support bar attached proximate rearward ends of the arms for maintaining a spacing; one or more rear arm holders attached to the rear support bar; and two or more power arms for connecting to a V-plow mount, each power arm being pivotably connected to a front or rear arm holder and being mountable to positions both above and below the V-plow cleaner.

17 Claims, 9 Drawing Sheets

FLIP-ABLE V-PLOW BELT CLEANER

CROSS-REFERENCE TO RELATED APPLICATIONS

This utility application claims the benefit under 35 U.S.C. §119(e) of Provisional Application Ser. No. 61/644,115 filed on May 8, 2012 entitled FLIP-ABLE V-PLOW BELT CLEANER and whose entire disclosure is incorporated by reference herein.

BACKGROUND OF THE INVENTION

1. Field of Invention

The present invention relates to a belt cleaner and, in particular, to a V-plow belt cleaner that can be flipped over.

2. Description of Related Art

Belt cleaners of many types and kinds are employed to remove material from moving conveyor belts, and among those belt cleaners are conventional V-plow belt cleaners. V-plow belt cleaners have a cleaning element that is angled in the shape of a letter "V" and are placed on the clean return side of a conveyor belt with the apex of the "V" facing the direction from which the belt moves material towards the V-plow cleaner. As a result, as the movement of the conveyor belt moves material towards the V-plow belt cleaner, the carried material is moved to and falls from both edges of the conveyor belt. Typically, a V-plow belt cleaner presses against the conveyor belt by the action of gravity upon the weight of the belt cleaner.

As with all belt cleaners, the cleaning elements of V-plow belt cleaners wear due to abrasion with the conveyor belt and the material carried thereon. For practical as well as safety reasons, the entire conveyor must be shut down so that workers can safely access the belt cleaner and replace the worn cleaning element thereof, thereby causing loss of production. With conventional belt cleaners, the conveyor must be shut down and the cleaning element replacement process must be performed each time any cleaning element (and there may be plural belt cleaners having plural cleaning elements for a typical conveyor) wears to the point of needing to be replaced.

Because belt cleaners may be intended for use with relatively wide conveyor belts, e.g., conveyor belts having widths of about 18 inches up to about 96 inches (about 46 cm to about 244 cm), the belt cleaners therefor can be relatively large and heavy, and so it can be difficult and time consuming to remove worn cleaning elements and to install fresh cleaning elements. Often, the replacement of cleaning elements requires removal of the complete belt cleaner and replacement of the worn cleaning elements off-line, if not transport of the belt cleaner to a facility separated from the conveyor system, whereby the conveyor belt must be stopped for a considerable time, thereby causing loss of production.

Inventors believe that there is a need for a belt cleaner, e.g., a V-plow belt cleaner, which could reduce the time and effort required to replace worn cleaning elements. It would also be desirable if fewer items of cleaning element were required, thereby possibly reducing the inventory and/or cost of replacement cleaning elements.

All references cited herein are incorporated herein by reference in their entireties.

BRIEF SUMMARY OF THE INVENTION

Accordingly, a flip-able V-plow belt cleaner usable with cleaning media that have opposing cleaning edges in both directions away from their mounting interface, may comprise: left and right arms joined to define an apex, each arm providing a mounting interface for receiving cleaning media; a rear support bar attached to the left and right arms for maintaining a spacing between the rearward ends thereof; two or more power arms for connecting to a V-plow mount, one power arm being pivotably connected to the V-plow proximate the apex and one or more of the power arms being pivotably connected to the rear support bar, the power arms being disposable to positions both above and below a plane defined by the left and right arms.

According to another aspect, a method for providing a fresh cleaning edge for a V-plow belt cleaner that is connected to a belt cleaner mount by pivotable power arms and is disposed on a conveyor belt for removing material therefrom, the V-plow belt cleaner having a cleaning element that provides first and second opposing cleaning edges, the method may comprise: disconnecting the V-plow belt cleaner from the belt cleaner mount after the first cleaning edge of the cleaning element thereof has been used; flipping the V-plow belt cleaner over so that the second cleaning edge is adjacent the conveyor belt; and reconnecting the V-plow belt cleaner to the belt cleaner mount.

BRIEF DESCRIPTION OF SEVERAL VIEWS OF THE DRAWINGS

The invention will be described in conjunction with the following drawings in which like reference numerals designate like elements and wherein.

Figure 1:
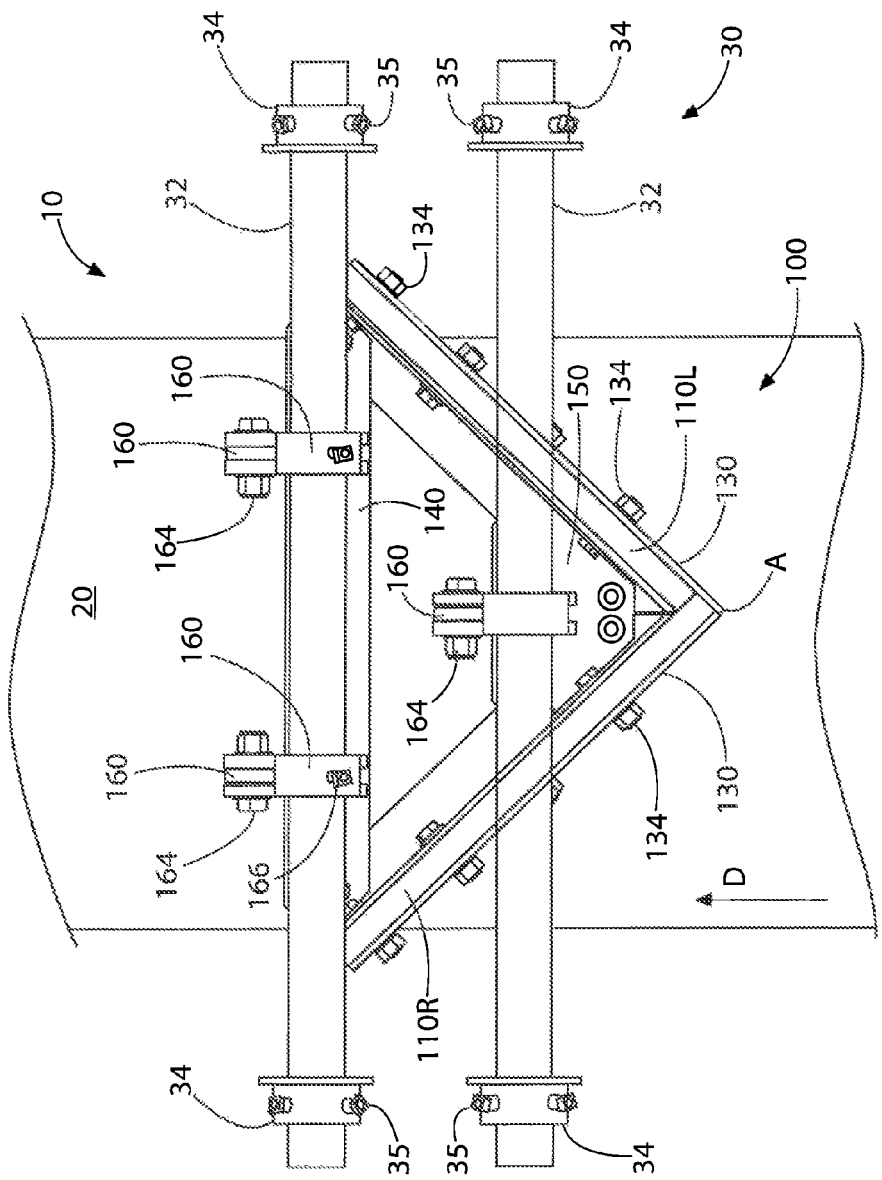
FIG. 1 is a top view of an example embodiment of a V-plow beneath and coupled to two mounting tubes.

In the Drawing, where an element or feature is shown in more than one drawing figure, the same alphanumeric designation may be used to designate such element or feature in each figure, and where a closely related or modified element is shown in a figure, the same alphanumerical designation primed or the like may be used to designate the modified element or feature. Similarly, similar elements or features may be designated by like alphanumeric designations in different figures of the Drawing and with similar nomenclature in the specification. According to common practice, the various features of the drawing are not to scale, and the dimensions of the various features may be arbitrarily expanded or reduced for clarity, and any value stated in any Figure is given by way of example only.

DETAILED DESCRIPTION OF THE INVENTION

While the invention has been described in detail and with reference to specific examples thereof, it will be apparent to one skilled in the art that various changes and modifications can be made therein without departing from the spirit and scope thereof.

Figure 2:
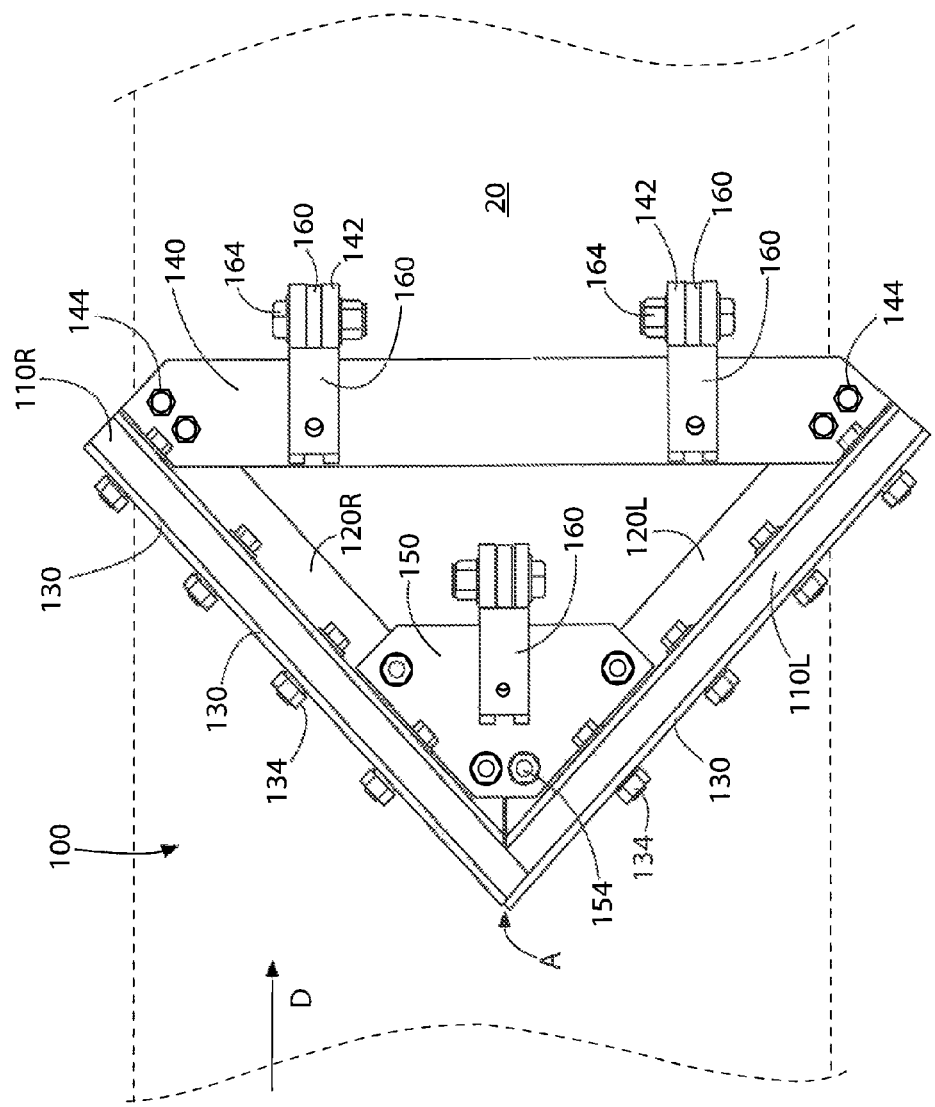
FIG. 2 is a top view of the example embodiment of the V-plow of FIG. 1 without the mounting tubes.
Figure 3:
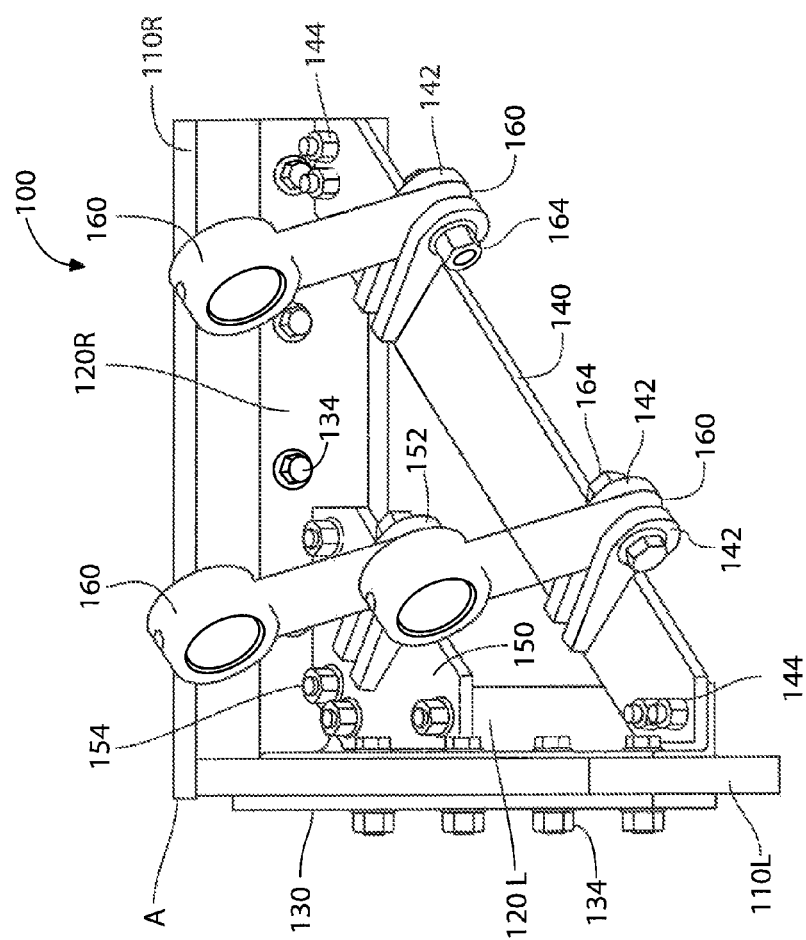
FIG. 3 is a perspective view of the example V-plow of FIG. 1 viewed from a rear quarter thereof.
Figure 4:
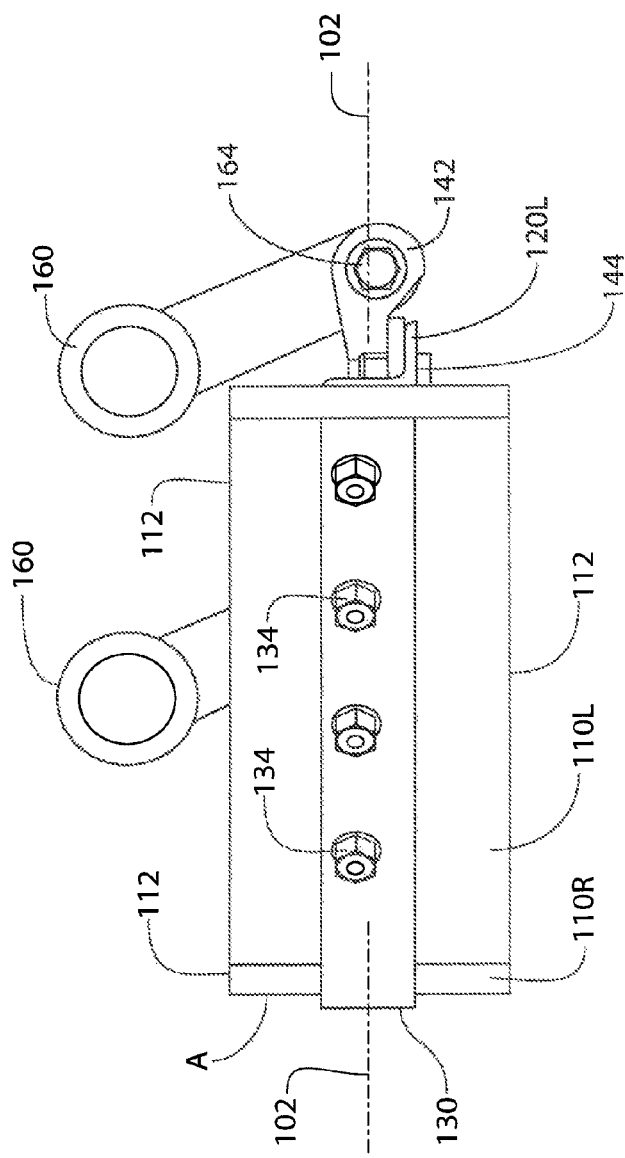
FIG. 4 is a side view of the example V-plow of FIG. 1.
Figure 5:
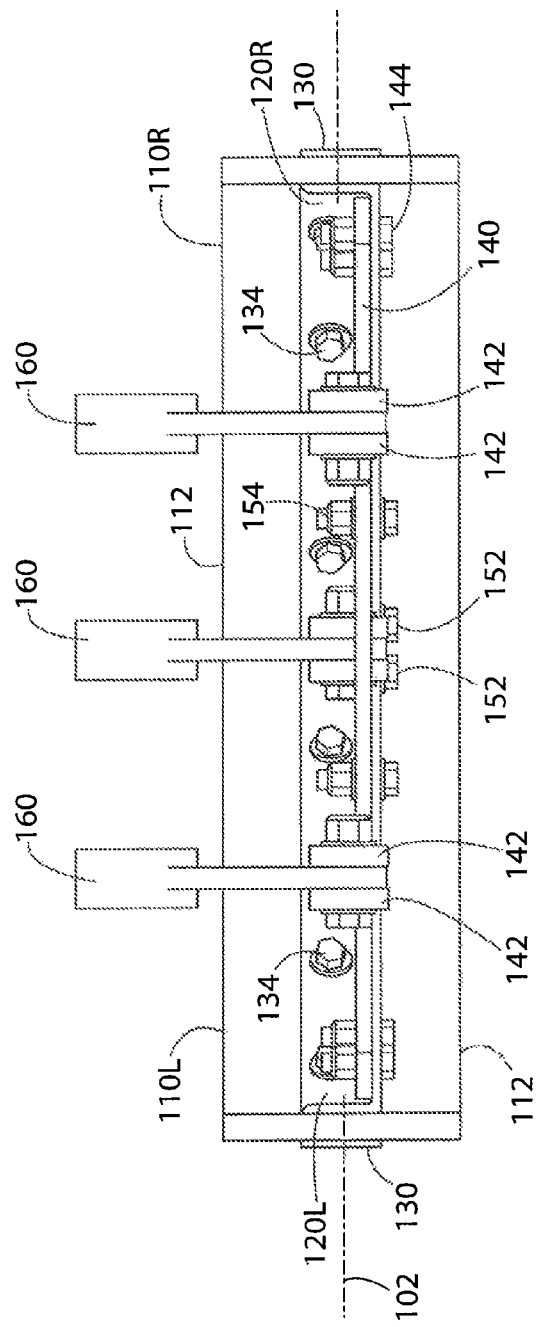
FIG. 5 is a rear view of the example V-plow of FIG. 1.

V-plow 100 is described in relation to: FIG. 1 which is a top view of an example embodiment of a V-plow 100 beneath and coupled to two mounting tubes 32 of mounting 30, FIG. 2 which is a top view of the example embodiment of the V-plow 100 of FIG. 1 without the mounting tubes 32, FIG. 3 which is a perspective view of the example V-plow 100 viewed from a rear quarter thereof; FIG. 4 which is a side view of the example V-plow 100, and FIG. 5 which is a rear view of the example V-plow 100. In a conveyor system 10 an endless conveyor belt 20 is looped at one end around a drive pulley and at the other end around an idler pulley, and may have any number of intermediate supporting rollers and/or other supports (not shown). The drive pulley rotates to cause the conveyor belt 20 to move in the direction D as indicated by an arrow, whereby material may be carried on the upper surface (the carry surface) of the conveyor belt 20.

A belt cleaner 100 is provided at a location whereat material carried by the conveyor belt 20 is to be removed therefrom. Example V-plow 100 rides on the clean return surface of conveyor belt 20 and includes cleaning media 110 arranged in the form of a letter "V" thereby to define an apex A at the forward end of V-plow 100 which faces the direction from which material carried by conveyor belt 20 approaches V-plow 100. The rearward ends of cleaning media 110 are spaced apart by a distance that is slightly greater than the transverse dimension or width of conveyor belt 20, whereby material carried by conveyor belt 20 is cast off to one side or the other by cleaning elements 110 (e.g., 110L and 110R) of V-plow 100.

Advantageously, V-plow 100 has sufficient symmetry from top to bottom (e.g., vertically) that it may be placed on conveyor belt 20 and be used in either orientation, and so is "flip-able." The structure 120, 130, 140, 150 of V-plow 100 is substantially symmetrical in that it is positioned relatively centrally relative to the opposing wear edges 112 of cleaning media 110 (e.g., in a "vertical" direction) when cleaning media 110 is fresh (unworn), and cleaning media 110 extends comparable distances in both vertical directions from structure 120, 130, 140, 150 of V-plow 100, e.g., relative to the line of openings in left and right arms 120L, 120R by which cleaning elements 110L, 110R, respectively, are fastened 134 thereto at a cleaning media mounting interface.

Although the plate portions of rear support bar 140 and front nose plate 150 attach to the horizontal portions of the angled pieces that are left and right arms 120L, 120R may all be slightly off center 102 vertically, the openings for fasteners 164 through arm supports 142 of rear support bar 140 and for fasteners 164 through arm supports 152 of front nose plate 150 are spaced away vertically from rear support bar 140 and front nose plate 150, respectively, so as to be more closely in plane 102 with the openings in left and right arms 120L, 120R, thereby to maintain substantial or approximate symmetry. While substantial vertical symmetry of certain aspects of V-plow 100 and of cleaning media 110 therefor is desirable, it is not necessary for such symmetry to be exact, as asymmetry inherently occurs as each side of cleaning media 110 wears away in use, and yet V-plow 100 remains flip-able so that both cleaning edges 112 of cleaning elements 110L, 110R may be utilized.

The cleaning media 110L, 110R of V-plow 100 extend both upwardly and downwardly from the structure 120, 130, 140, 150 of V-plow 100 thereby to provide opposing cleaning edges 112, one at the bottom to contact conveyor belt 20 and another at the top. When initially installed, one of cleaning edges 112 of cleaning media 110 rests against conveyor belt 20 and the other cleaning edge 112 is facing away from conveyor belt 20. When the first cleaning edge 112 has worn to the point where cleaning media 110 is deemed in need of being replaced, V-plow 100 may be released from support 30, may be flipped over so that the fresh cleaning edge 112 of cleaning media 110 now rests against conveyor belt 20 and the worn edge 112 is on top, and V-plow 110 may then be reconnected to support 30 to be ready for use without the removal and replacement of cleaning elements 110L, 110R.

Advantageously, the foregoing feature not only reduces the time and cost of replacing worn cleaning media, but can also reduce the needed inventory of replacement cleaning media, the cost of replacement cleaning media, and the waste to be disposed of (only one central region remnant to be disposed of per two cleaning media replaced instead of two).

V-plow 100 bears against conveyor belt 20 by the force of gravity acting on the substantial weight of V-plow 100, typically without the need for springs or other tensioning devices. Mounting 30 serves to locate V-plow 100 substantially centrally in the direction transverse to conveyor belt 20, e.g., relative to the width of belt 20, and to retain V-plow 100 in substantially the same location in the direction of travel D of conveyor belt 20. V-plow 100 is free to move vertically closer to and away from the plane of conveyor belt 20 by its power arms 160 that connect to mounting 30.

In the illustrated example, V-plow 100 includes three power arms 160 that connect to two parallel spaced apart mounting tubes 32 that are located transversely to and a fixed distance above conveyor belt 20. The ends of mounting tubes 32 pass through openings in and are supported by mounting brackets or mounting plates or other fixed structure of conveyor system 10, and so remain stationary even when conveyor belt 20 moves. Side to side movement of each mounting tube 32 is constrained by two collars 34, one at each end of the mounting tube 32, that are secured in place on mounting tube 32 by one or more set screws 35. The single power arm 160 close to the apex A or nose of V-plow 100 is connected between front nose plate 150 and the forward most mounting tube 32, and two additional power arms 160 are connected between spaced apart arms 142 of rear support bar 140 and the rearward most mounting tube 32.

Because each power arm 160 is free to rotate on its mounting tube 32 and is also free to rotate at its connection 164 to front nose plate 150 and rear support bar 140. V-plow 100 is free to move vertically relative to conveyor belt 20, and so as cleaning elements 110L, 110R wear, V-plow 100 tends to move lower due to the force of gravity to compensate for the wear of cleaning elements 110L, 110R which remain in firm contact with conveyor belt 20. Preferably, the spacing between transverse lines passing through the joints 164 of the forward and rearward power arms 160 is substantially the same as the spacing between mounting tubes 32, thereby to define a geometry approximating a parallelogram configuration that allows V-plow 100 to move substantially vertically while cleaning media 110 remaining substantially parallel to conveyor belt 20.

Further, the length of power arms 160 and the distance (height) that mounting tubes 32 are mounted above conveyor belt 20 are selected to provide a desired range of vertical travel for V-plow 100. That length of power arms 160 and height of mounting tubes 32 limit, e.g., how low the structure 120, 130, 140, 150 of V-plow 100 may drop, and preferably limit that vertical drop distance so that the structure elements 120, 130 cannot come into contact with and possibly damage conveyor belt 20 when cleaning elements 100 reach their fully worn condition. The foregoing vertical drop distance tends to determine the maximum length of power arms 160, and the wear dimension of cleaning elements 110L, 110R tend to determine the minimum length of power arms 160.

Cleaning media 110 or cleaning elements 110 may include one piece of cleaning media material or may include plural pieces of cleaning media material. In the example illustrated, cleaning media 110 includes a left cleaning element 110L and a right cleaning element 110R that together define the "V" shape of cleaning media 110. One of cleaning elements 110R, 110L is slightly longer than the other so that a butt joint may be formed near apex A whereby cleaning elements 110R, 110L together define a symmetric cleaning element 110 having left and right arms of the same length.

Generally rectangular cleaning media 110L, 110R include respective central regions at which they are fastened to right and left arms 120L, 120R and opposing wear regions to either side of the central wear region, thereby to be usable in either vertical orientation. The central region of each cleaning element 110 has a plurality of holes therethrough generally along a line evenly spaced between the top and bottom wear edges 112 thereof. Cleaning elements 110 are fastened between support plates 130 and the left and right arms 120L, 120R by a plurality of fasteners 134, e.g., bolts and nuts, placed through aligned holes in support plates 130, in cleaning elements 110, and in left and right arms 120L, 120R, thereby mounting cleaning media 110 to V-plow 100 at a mounting interface.

V-plow 100 includes a "V" shaped structure 120, 130, 140, 150 for supporting cleaning elements 110 substantially in a "V" configuration and for connecting to mounting 30. The V-shaped structure includes right and left arms 120R and 120L that are joined together at their respective forward ends near apex A by front nose plate 150 thereby to define the angle at apex A. A rear support bar 140 extends transversely and is fastened at its opposing ends to the respective rearward ends of left and right arms 120L, 120R, e.g., by fasteners 144, e.g., bolts and nuts 144. Arms 120 and rear support bar 140 define a triangle that provides strength and rigidity for supporting cleaning elements 110 against the forces of friction with conveyor belt 20 and the material carried thereby.

Power arms 160 have transverse through openings at their respective upper ends to provide in cooperation with mounting tubes 32 a pivotable connection, whereby power arms 160 are free to rotate in the vertical plane relative to mounting tubes 32 so that V-plow 100 is movable vertically. Front nose plate 150 has a spaced apart pair of arm holders 152 extending rearwardly and rear support bar 140 has two pairs of arm holders 142 extending rearwardly, all for providing pivotable connections 164 with the lower ends of power arms 160, whereby power arms 160 are free to rotate in the vertical plane relative to V-plow 100 structure 120, 130, 140, 150 so that V-plow 100 is movable vertically, e.g., relative to conveyor belt 20.

Assembly, installation and removal of V-plow 100 may be performed as follows. The angled forward ends of right and left arms 120L, 120R are fastened, e.g., by bolts 154, to front nose plate 150 and the rearward ends thereof are fastened, e.g., by bolts 144, to the opposing ends of rear support bar 140, thereby to form the central triangular structure 120,130, 140 150 of V-plow 100. It is noted that rear support bar 140 and front nose plate 150 are oriented so that their respective arm holders 142, 152 are substantially or nearly in plane with the line of fastener openings in left and right arms 120L, 120R. Fresh cleaning elements 110L, 11 OR are fastened to left and right arms 120L, 120R, respectively, at a mounting interface, e.g., by fasteners 134 passing through respective support plates 130, cleaning elements 110L, 110R, and left and right arms 120L, 120R. The order of assembly is immaterial.

Assembly and installation of V-plow 100 may proceed in either of at least two different ways or methods. In a first way or method, power arms 160 are connected by respective fasteners 164 to the arm holders 142, 152 of rear support bar 140 and front nose plate 150, and V-plow 100 is then placed on conveyor belt 20 beneath the locations where mounting tubes 32 will be installed. Mounting tubes 32 are then installed through their mounting openings on the conveyor structure and through the openings at the free ends of power arms 160. Where power arms 160 are retained in position on mounting tubes 32, e.g., by a set screw 166, mounting tubes 32 are free to rotate so that power arms 160 are pivotable to allow vertical movement of V-plow 100. Alternatively, and/or additionally, power arms 160 may be rotatable relative to mounting tubes 32 and may be retained in position thereon, e.g., by pairs of collars fastened to mounting tubes 32.

In a second way or method, power arms 160 may be installed on mounting tubes 32 that are installed on the conveyor structure as described above, e.g., either free to pivot or fixed, but a set screw 166, if employed, preferably is not tightened. Assembled V-plow 100 is then placed on conveyor belt 20 beneath the installed mounting tubes 32 and power arms 160 hanging therefrom, and V-plow 100 is positioned so that the lower ends of hanging power arms 160 are between arm holders 142, 152 of rear support bar 140 and front nose plate 150. Fasteners 164 are then installed to connect rear support bar 140 and front nose plate 150 of V-plow 100 to power arms 160. With V-plow 100 in its operating position on conveyor system 10, the power arm set screws 166, if employed, may be tightened.

Reversing, or flipping, of V-plow 100, e.g., when one of cleaning edges 112 is worn to need replacement may be performed in either of at least two different ways or methods as follows. In a first way, mounting tubes 32 are removed which frees power arms 160 which remain fastened to the remainder of V-plow 100. V-plow 100 is flipped over so that the unused cleaning edges 112 of cleaning elements 110L, 110R are resting against conveyor belt 20 (the worn cleaning edges 112 are now on top, facing away from conveyor belt 20) and power arms 160 are pivoted on connections 164 to be on the top of the flipped V-plow 100. Mounting tubes 32 are then reinstalled through power arms 160 and set screws 166, if any, are tightened, so that V-plow 100 is ready for use on conveyor system 10 with fresh cleaning edges 112.

For all but the smallest sizes of V-plow 100 there is sufficient distance between rear support bar 140 and front nose plate 150 for all of power arms 160 to pivot fully without interference between the front power arm 160 and rear support bar 140. On a smaller size V-plow 100, where an interference exists, either the front power arm 160 may be removed by removing its fastener 164 and re-fastening it with power arm 160 positioned on the opposite side of flipped V-plow 100, or rear support bar 140 may be at least partly removed to permit the front power arm 160 to be pivoted to the opposite or flipped position.

In the second way or method to flip V-plow 100, fasteners 164 may be removed to release V-plow 100 from power arms 160 which remain hanging on mounting tubes 32. V-plow 100 may then be flipped over so the fresh cleaning edges 112 of cleaning elements 110L, 110R are placed against conveyor belt 20. V-plow 100 is then re-positioned beneath mounting tubes 32 with power arms 160 hanging in respective positions between arm holders 142, 152 to be re-fastened thereto by fasteners 164. If this second method is employed, any interference between the front power arm 160 and rear support bar 140 is avoided, and it may be easier to flip V-plow 100 because power arms 160 are not connected thereto.

Replacement of cleaning media 110, 110L, 110R may be accomplished by following either of the above methods for removing and installing V-plow 100 as when flipping V-plow 100 above, except that instead of flipping the freed V-plow 100, fasteners 134 and support plates 130 are removed from left and right arms 120L, 120R to release the worn cleaning elements 110L, 110R therefrom. Fresh cleaning media 110L, 110R are then installed on left and right arms 120L, 120R and are retained thereon by fasteners 134 passing through support plate 130, cleaning elements 110L, 110R and left and right arms 120L, 120R, respectively. V-plow 100 is then reinstalled, e.g., by either of the above methods therefor as described for flipping V-plow 100, on conveyor system 10.

Alternatively, as may be convenient in a particular instance, any combination of the steps of the foregoing first and second methods may be employed. For example, for V-plows 100 intended for conveyor belts 20 having relatively narrow widths, e.g., widths less than about 42 inches (about 107 cm), the distance between rear support bar 140 and front nose plate 150 may not be sufficient to permit front power arm 160 to be pivoted from its position on one side to V-plow 100 to a corresponding position on the other side thereof. In this instance, front power arm 160 may be removed and reinstalled on the other side, e.g., by removing fastener 164, repositioning power arm 160 and then reinstalling fastener 164.

Further, when cleaning media 110 need to be replaced, the worn cleaning media may be replaced with V-plow 100 resting on conveyor belt 20. Alternatively, V-plow 100 with worn cleaning media thereon may be removed from conveyor belt 20 to a convenient work location which may be proximate conveyor belt 20, e.g., a location along conveyor belt 20 or a work table nearby, or may be remote from conveyor system 10, e.g., in a work shop or maintenance facility.

Figure 6A:
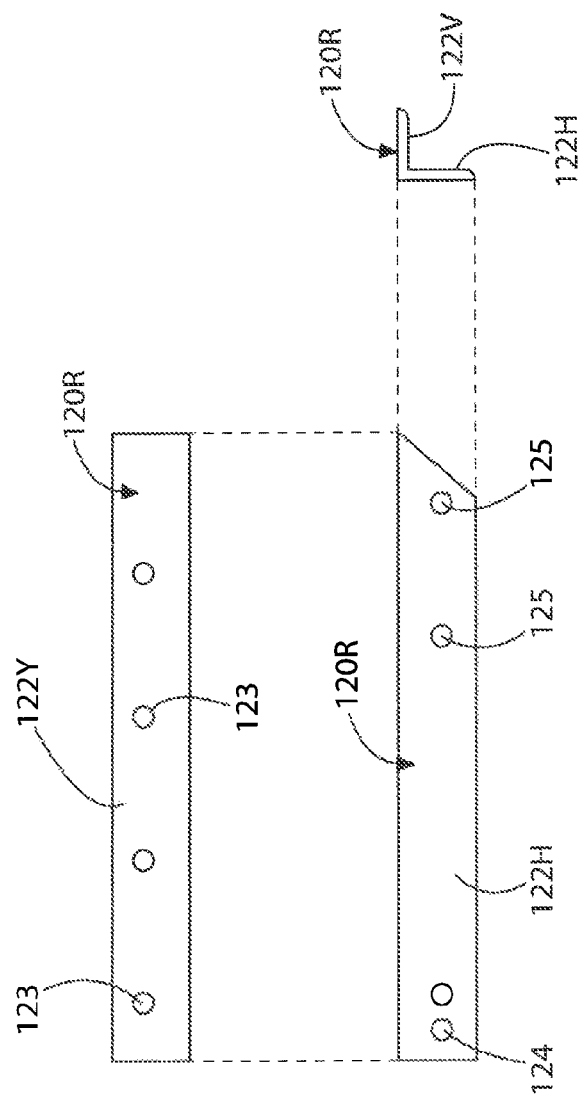
FIGS. 6A-6D include a number of sets of orthogonal views of various parts and members of the example V-plow of FIG. 1 including: a right arm thereof in FIG. 6A, a rear support bar in FIG. 6B, a front nose plate in FIG. 6C, and a power arm in FIG. 6D.
Figure 6B:
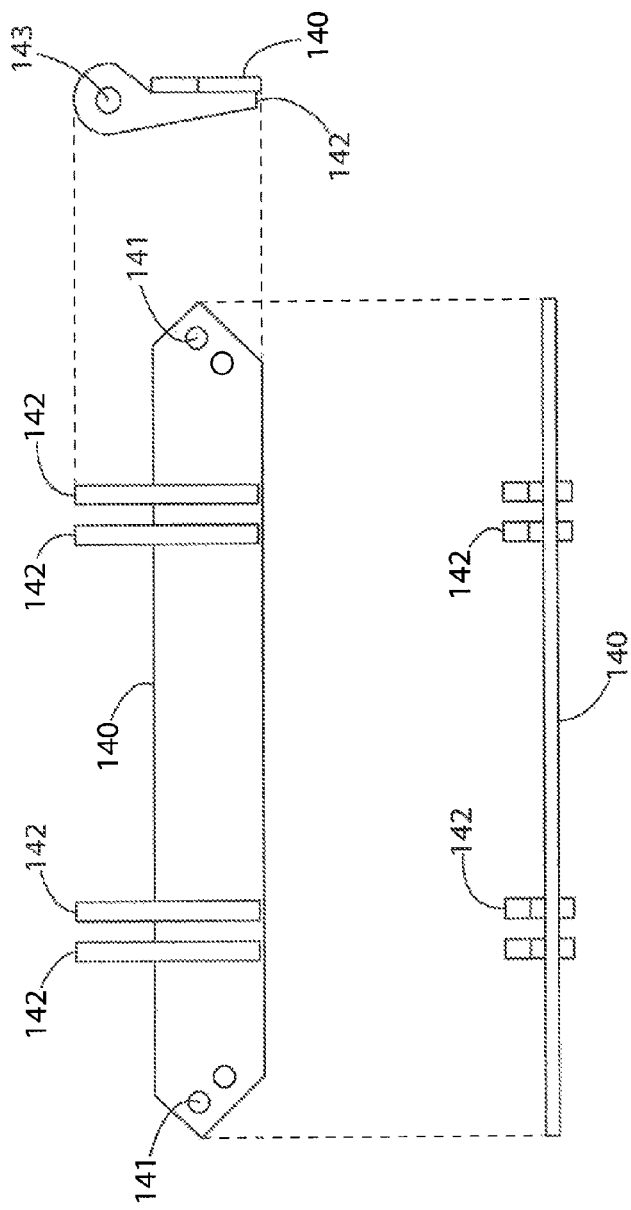
Figure 6C:
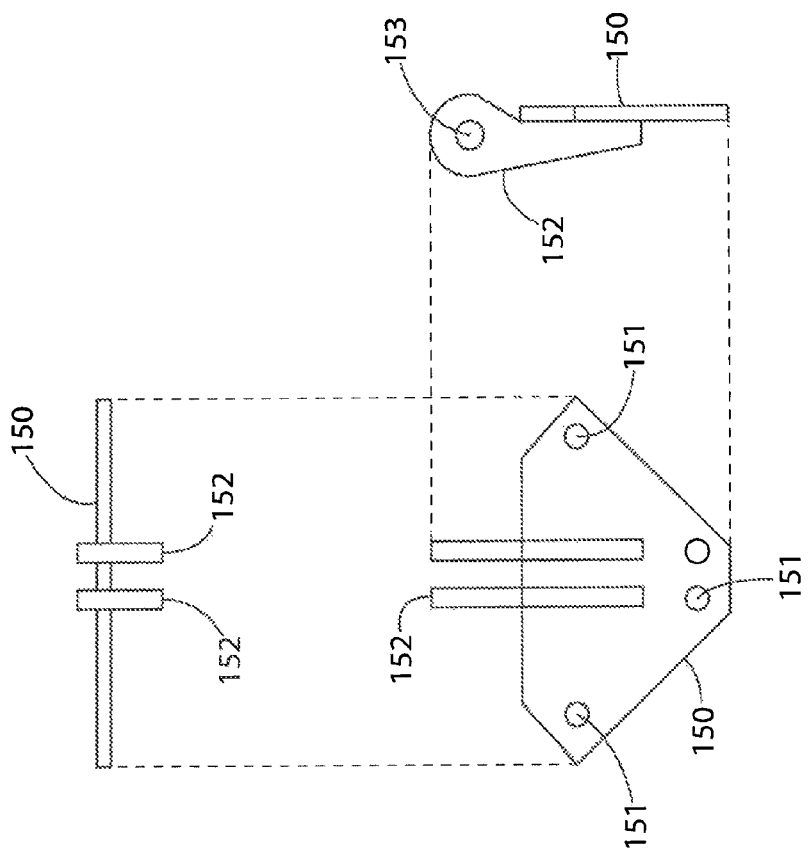
Figure 6D:
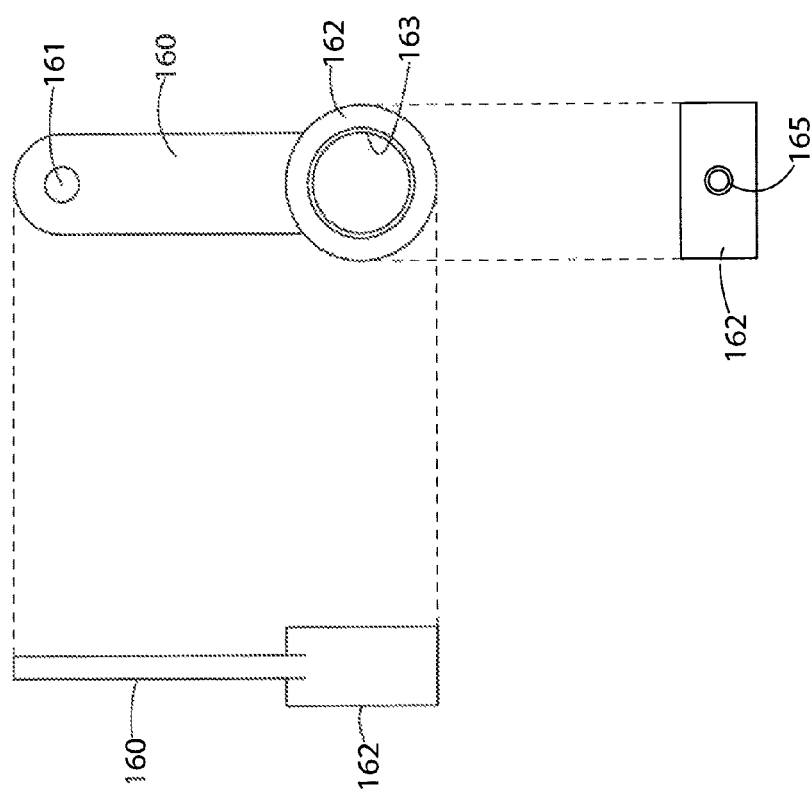

FIGS. 6A-6D includes a number of sets of orthogonal views of various parts and members of the example V-plow 100 of FIG. 1 including a right arm 120R thereof in FIG. 6A, rear support bar 140 in FIG. 6B, a front nose plate 150 in FIG. 6C, and a power arm 160 in FIG. 6D. Right arm 120R is typically a steel angle having angle parts 122V, 122H that are disposed in the vertical and horizontal planes, respectively when arm 120 is assembled into V-plow 100. Arm 120 has along the vertical angle part 122V plural spaced apart holes 123 for receiving cleaning element fasteners 134 therethrough, and has in the horizontal angle part 122H pairs of holes 124, 125 for receiving fasteners 144 that attach rear support bar 140 thereto and fasteners 154 that attach front nose plate 150 thereto, respectively. The end of horizontal angle part 122H that is disposed near apex A is angled, e.g., at an angle that is about one-half the angle of the apex A of V-plow 100. Left arm 120L is a mirror image of right arm 120R.

Cleaning elements 110 are generally rectangular blocks and have regularly spaced apart holes therethrough, e.g., at the same spacing as holes 123 of left and right arms 120L, 120R for receiving fasteners 134 therethrough. The left and right cleaning elements 110L, 110R have the same height and thickness, but one of the cleaning elements 110L, 110R is longer than the other by about the thickness thereof so as to allow for a butt joint at apex A. The holes through cleaning media 110 are along a line that is substantially evenly spaced from the opposing cleaning edges 112 thereof, so that wearing regions are provided both above and below the fastener line and support plate 130.

Support plates 130 are generally rectangular steel bars and have regularly spaced apart holes therethrough, e.g., at the same spacing as holes 123 of left and right arms 120L, 120R and of cleaning media 110L, 110R for receiving fasteners 134 therethrough. The left and right support plates 130L, 130R have the same height and thickness, but one of the support plates 130L, 130R is longer than the other by about the thickness thereof so as to allow for a butt joint at apex A. The holes through support plates 130 are along a line that is substantially evenly spaced from the opposing edges thereof, so that substantially equal wearing regions of cleaning elements 110 are provided both above and below support plate 130.

Rear support bar 140 shown in FIG. 6B is typically a somewhat rectangular steel bar 140 (with angled ends) and having a pair of holes 141 at each end for receiving fasteners 144 that attach rear support bar 140 to left and right arms 120L, 120R. The ends of support bar 140 are angled so as to align with arms 120 which are disposed at angles determined by the angle of apex A. Two pairs of arm holders 142 are welded to support bar 140 each pair being spaced a like distance away from the ends of support bar 140, preferably with a distance of at least one half of the length of support bar 140 between the pairs of arm holders 142. In each pair, arm holders 142 are spaced apart for receiving the flat end of power arm 160 therebetween. Arm holders 142 have holes 143 for receiving fasteners 164 therethrough to provide pivotable connections with power arms 160.

Front nose plate 150 shown in FIG. 6C, is typically a steel plate 150 of generally triangular shape (with the points of the triangle cut off) and having holes 151 along adjacent edges thereof for receiving fasteners 154 that attach front nose plate 150 to left and right arms 120L, 120R. The adjacent sides of front nose plate 150 are angled so as to align with arms 120 which are disposed at angles determined by the angle of apex A. A pair of arm holders 152 are welded to nose plate 150 generally centered along the rear edge thereof. Arm holders 152 are spaced apart for receiving the flat end of front power arm 160 therebetween. Arm holders 152 have holes 153 for receiving fasteners 164 therethrough to provide a pivotable connection with power arm 160.

Power arm 160 shown in FIG. 6D is a steel member that has a flat lower portion and a circular upper ring portion 162. Flat lower portion has a hole 161 therethrough near one end thereof for receiving a fastener 164 which provides pivotable connections with rear support bar 140 and front nose plate 150, as the case may be. A ling portion 162 at the other end of the flat lower portion has an opening 163 therethrough for receiving a mounting tube 32. A threaded hole 165 is provided for receiving an optional set screw 166 for retaining power arm 160 in a desired position on mounting tube 32.

In a typical embodiment of V-plow 100 wherein the apex angle is about 90°, arms 120 are about 2 inch (about 5.1 cm) steel angle that is about 0.25 inch (about 64 mm) thick with about 0.56 inch (about 1.4 cm) diameter holes equally spaced about 4 inches (about 10.2 cm) apart for receiving ½ inch (about 13 mm) diameter steel fasteners 134, and have a length that varies with the width of the conveyor belt with which they are intended to be utilized. The ends of arms 120 are at an about 45° angle. Support plates 130 are about 2 inches (about 5.1 cm) wide and about 0.25 inch (about 6.4 mm) thick steel with about 0.56 inch (about 1.4 cm) diameter holes equally spaced about 4 inches (about 10.2 cm) apart for receiving ½ inch (about 13 mm) diameter steel fasteners 134, and have a length that varies with the width of the conveyor belt they are intended to be utilized with, although one, e.g., the left support plate, is longer than the other by their about ¼ inch (about 6 4 mm) thickness. Rear support bar 140 is has a width of about 3 inches (about 7.6 cm) and is about 0.38 inch (about 9.7 mm) thick steel with about 0.56 inch (about 1.4 cm) diameter holes for receiving ½ inch (about 13 mm) diameter steel fasteners 144, and has a length that varies with the width of the conveyor belt with which it is intended to be utilized. The ends of rear support bar 140 are at an about 45° angle.

Steel front nose plate 150 is about 9.3 inches (about 24.5 cm) across and about 5 inches (about 12.7 cm) front to back, and is about 0.38 inch (about 9.7 mm) thick steel with about 0.56 inch (about 1.4 cm) diameter holes for receiving ½ inch (about 13 mm) diameter steel fasteners 154.

In the example embodiment, arm holders 142, 152 are about 0.5 inch (about 1.3 cm) thick steel and are about 5 inches (about 12.7 cm) long with an about 0.7 inch (about 1.8 cm) diameter hole for receiving fasteners 164, and are welded to rear support bar 140 and to front nose plate 150 in pairs that are spaced apart by about 0.63 inch (about 1.6 cm). Power arms 160 are about 10.25 inches (about 26 cm) long, about 0.5 inches (about 1.3 cm) thick, with an about 0.7 inch (about 1.8 cm) diameter hole for receiving fasteners 164 and an about 2 inch (about 5.1 cm) diameter hole for receiving a less than about 2 inch (about 5.1 cm) diameter steel mounting tube 32. The adjacent sides of front nose plate are at an about 45° angle from the rear edge thereof, e.g., so as to substantially match the 90° angle at apex A. Set screws are typically ½ inch (about 13 mm) diameter steel threaded fasteners.

Cleaning elements 110L, 110R are about 8 inches (about 20.3 cm) high and about 1 inch (about 5.1 cm) thick rubber, neoprene, urethane, polyurethane, UHMW polyethylene, or other suitable material with about 0.56 inch (about 1.4 cm) diameter holes equally spaced about 4 inches (about 10.2 cm) apart and about 3 inches (about 7.6 cm) from cleaning edges 112 for receiving A. inch (about 13 mm) diameter steel fasteners 134, and have lengths that vary with the width of the conveyor belt with which it is intended to be utilized, although one, e.g., the right cleaning element, is longer than the other by their about 1 inch (about 5.1 cm) thickness.

Typically, the holes through each of cleaning elements 110L, 110R, arms 120L, 120R and support plates 130L, 130R for receiving fasteners 134 are not symmetrically placed along the length thereof, and the first of the holes is typically between about 1.5 and 3 inches (about 3.8 and 7.6 cm) from the rearward end thereof. Further, the number of fastener holes is greater for wider conveyor belt 20 widths, e.g., three holes for an 18 inch (about 45.7 cm) wide conveyor belt, four holes for a 24 inch (about 60.1 cm) wide conveyor belt, five holes for a 30 inch (about 76 cm) wide conveyor belt, eight holes for a 48 inch (about 122 cm) wide conveyor belt, ten holes for a 60 inch (about 152 cm) wide conveyor belt, and seventeen holes for a 96 inch (about 244 cm) wide conveyor belt.

Typical lengths for examples of cleaning media 110, arms 120, support plates 130 and rear support bar 140 vary with the width of the conveyor belt 20 with which V-plow 100 is intended to be used and may be approximately as shown in Table I following:

The dimensions set forth in Table I are approximate and do not explicitly set forth differences between right and left side parts which can be determined from the example information herein by one of ordinary skill in the art. Typically the steel used for parts 120, 130, 140, 150, 160 may be a mild steel or a stainless steel.

A flip-able V-plow belt cleaner 100 usable with cleaning media 110 that have opposing cleaning edges 112 in both directions away from their mounting interface, the V-plow belt cleaner 100 may comprise: left and right arms 120 joined together at forward ends thereof to define an apex, each arm 120 providing a mounting interface for receiving cleaning media 110 thereat; a front arm holder 150, 152 attached to the arms 120 proximate the apex, the arm holder 150, 152 having a transverse hole; a rear support bar 140 attached proximate rearward ends of the left and right arms 120 for maintaining a spacing between the rearward ends of the left and right arms 120; one or more rear arm holders 140, 142 attached to the rear support bar 140 intermediate the ends thereof; and two or more power arms 160 for connecting to a V-plow mount 30, each power arm 160 being pivotably connected to one of the front and rear arm holders 140, 142, 150, 152 and being disposable to positions both above and below a plane defined by the left and right arms and the rear support bar, whereby the V-plow belt cleaner 100 may be connected to a V-plow mount 30 with the power arms 160 disposed to one side of the plane defined by the left and right arms 120 and the rear support bar 140 and may be flipped over and attached to the V-plow mount 30 with the power arms 160 disposed to the other side of the plane defined by the left and right arms 120 and the rear support bar 140, the V-plow belt cleaner 100 thereby being usable in either orientation. The V-plow belt cleaner 100 may further comprise one or more cleaning elements 110 mounted to the left and right arms 120, wherein the one or more cleaning elements 110 have first and second opposing cleaning edges 112 that are respectively above and below the arms 120, whereby when the first cleaning edge 112 becomes worn, the V-plow belt cleaner 100 may be flipped over for using the second cleaning edge 112. The left and right arms 120 may be connected to a front nose plate 150 to define the apex. The front arm holder 152 may be attached to the front nose plate 150. Each of the front and rear arm holders 120 may have a transverse hole aligned with a transverse hole of an associated one of the power arms 160, V-plow 100 farther comprising a fastener 164 through the aligned holes of associated power arms 160 and arm holders 142, 152 for providing the pivotable connection. Each power arm 160 may be pivotable to positions both above and below the plane defined by the left and right arms 120 and the rear support bar 140. The V-plow belt cleaner 100 may further comprise a V-plow mount 30 including front and rear mounting tubes 32, wherein the front power arm 160 is connected to the front mounting tube 32 and the one or more rear power arms 160 are connected to the rear mounting tube 32. The front and rear

TABLE I

| Belt Width | | Media 120R | | Arm 120 | | Plate 130L | | Rear 140 Bar | |
|---|---|---|---|---|---|---|---|---|---|
| Inches | cm | Inches | cm | Inches | cm | Inches | cm | Inches | cm |
| 18 | 45.7 | 14.7 | 37.3 | 13.7 | 34.8 | 15 | 38.1 | 18.9 | 48 |
| 24 | 60.1 | 18.4 | 46.7 | 17.4 | 44.2 | 18.6 | 47.2 | 24.1 | 61.2 |
| 42 | 107 | 30.9 | 78.5 | 29.9 | 75.9 | 31.1 | 79 | 41.8 | 106 |
| 60 | 152 | 43.6 | 111 | 42.6 | 108 | 43.8 | 111 | 59.9 | 152 |
| 96 | 244 | 71.7 | 182 | 70.7 | 180 | 71.9 | 183 | 99.4 | 252 | power arms 160 may be pivotable on the front and rear mounting tubes 32 or the front and rear mounting tubes 32 may be rotatable. The front and rear mounting tubes 32 may be mounted transversely to a conveyor belt 20 with the V-plow belt cleaner 100 against the conveyor belt 20 with the apex of the V-plow belt cleaner 100 facing the direction of belt travel for removing material from the conveyor belt 20.

A method for providing a fresh cleaning edge for a V-plow belt cleaner 100 that is connected to a belt cleaner mount 30 by pivotable power arms 160 and is disposed on a conveyor belt 20 for removing material therefrom, the V-plow belt cleaner 100 having one or more cleaning elements 110 that provide first and second opposing cleaning edges 112, the method may comprise: disconnecting the V-plow belt cleaner 100 from the belt cleaner mount 30 after the first cleaning edge 112 of the one or more cleaning elements 110 thereof have been used; flipping the V-plow belt cleaner 100 over so that the second cleaning edge 112 is adjacent the conveyor belt 20; and reconnecting the V-plow belt cleaner 100 to the belt cleaner mount 160, whereby the second cleaning edge 112 of the one or more cleaning elements 110 is adjacent the conveyor belt 20. The method wherein the disconnecting the V-plow belt cleaner 100 from the belt cleaner mount 30 may include: disconnecting the power arms 160 of the V-plow belt cleaner 100 from the belt cleaner mount 30; the method may farther comprise: reversing the positions of the power arms 160 relative to the V-plow belt cleaner 100; and wherein the reconnecting the V-plow belt cleaner 100 to the belt cleaner mount 30 may include: reconnecting the power arms 160 of the flipped over V-plow belt cleaner 100 to the belt cleaner mount 30. The disconnecting the V-plow belt cleaner 100 from the belt cleaner mount 30 may include: disconnecting the power arms 160 from the V-plow belt cleaner 100; and the reconnecting the V-plow belt cleaner 100 to the belt cleaner mount 30 may include: reconnecting the power arms 160 to the flipped over V-plow belt cleaner 100. The flipping the V-plow belt cleaner 100 over may include: pivoting at least some of the power arms 160 from positions on the upper side of the V-plow belt cleaner 100 to corresponding positions on the now upper side of the flipped over V-plow belt cleaner 100; or pivoting all of the power arms 160 from positions on the upper side of the V-plow belt cleaner 100 to corresponding positions on the now upper side of the flipped over V-plow belt cleaner 100.

A flip-able V-plow belt cleaner 100 usable with cleaning media 110 that have opposing cleaning edges 11 in both directions away from their mounting interface, the V-plow belt cleaner 100 may comprise: left and right arms 120 joined together at forward ends thereof to define an apex, each arm 120 providing a mounting interface for receiving cleaning media 110 thereat; a rear support bar 140 attached proximate rearward ends of the left and right arms 120 for maintaining a spacing between the rearward ends of the left and right arms 120; two or more power arms 160 for connecting to a V-plow mount 30, one power arm 160 being pivotably connected to the V-plow arms 120 proximate the apex and one or more of the power arms 160 being pivotably connected to the rear support bar 140, the power arms 160 being disposable to positions both above and below a plane defined by the left and right arms 120, whereby the V-plow belt cleaner 100 may be connected to a V-plow mount 30 with the power arms 160 disposed to one side of the plane defined by the left and right arms 120 bar and may be flipped over and attached to the V-plow mount 30 with the power arms 160 disposed to the other side of the plane defined by the left and right arms 120 the V-plow belt cleaner 100 thereby being usable in either orientation. The V-plow belt cleaner 100 may further comprise one or more cleaning elements 110 mounted to the left and right arms 120, wherein the one or more cleaning elements 110 have first and second opposing cleaning edges 112 that are respectively above and below the arms 120, whereby when the first cleaning edge 112 becomes worn, the V-plow belt cleaner 100 may be flipped over for using the second cleaning edge 112. The left and right arms 120 may be connected to a front nose plate 150 to define the apex. The V-plow belt cleaner 100 may further comprise a front arm holder 152 attached to the front nose plate 150 for providing a pivotable connection to the one power arm 160. The V-plow belt cleaner 100 may include a front arm holder 152 connected proximate the apex and one or more rear arm holders 142 connected to the rear support bar 140, wherein each of the front and rear arm holders 142, 152 has a transverse hole aligned with a transverse hole of an associated one of the power arms 160, the V-plow 100 further comprising a fastener 164 through the aligned holes of associated power arms 160 and arm holders 142, 152 for providing the pivotable connection. Each power arm 160 may be pivotable to positions both above and below the plane defined by the left and right arms 120. The V-plow belt cleaner 100 may further comprise a V-plow mount 30 including front and rear mounting tubes 32, wherein the front power arm 160 is connected to the front mounting tube 32 and the one or more rear power arms 160 are connected to the rear mounting tube 32. The front and rear power arms 160 may be pivotable on the front and rear mounting tubes 32 or the front and rear mounting tubes 32 may be rotatable. The front and rear mounting tubes 32 may be mounted transversely to a conveyor belt 20 with the V-plow belt cleaner 100 against the conveyor belt 20 with the apex of the V-plow belt cleaner 100 facing the direction of belt travel for removing material from the conveyor belt 20.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

Although terms such as "up," "down," "left," "right," "front," "rear," "side," "top," "bottom," "forward," "rearward," "above," "under" and/or "over," and the like may be used herein as a convenience in describing one or more embodiments and/or uses of the present arrangement, the articles described may be positioned in any desired orientation and/or may be utilized in any desired position and/or orientation. Such terms of position and/or orientation should be understood as being for convenience only, and not as limiting of the invention as claimed.

While the present invention has been described in terms of the foregoing example embodiments, variations within the scope and spirit of the present invention as defined by the claims following will be apparent to those skilled in the art. For example, cleaning element 110 illustrated as being two rectangular cleaning media 110L, 110R may be a single piece of cleaning media that is bent or formed at apex A or may be plural cleaning media defining sections that are arranged in either an abutting or overlapping arrangement.

While V-plow structure 120, 130, 140, 150 is illustrated as including right and left arms 120L, 120R that are bolted together by nose plate 150 at a fixed apex A angle, left and right arms 120L, 120R may be connected by a pivotable or hinged joint and have rear support bar bolted thereto to define the width of V-plow 100 and to fix the apex A angle, e.g., as described in U.S. Pat. No. 7,584,835 entitled "Adjustable V-plow Apparatus For Deflecting Material Carried on a Belt" issued to D. Wimsatt et. al on Sep. 8, 2009.

Fasteners 134, 144, 154, 164 are typically steel bolts and locking nuts, but may employ other locking hardware, e.g., pins, cotter pins, clips and the like. Alternatively, fasteners that may be removed and reinstalled in normal operating maintenance, e.g., fasteners 134 and/or 164 which are removed and reinstalled in the flipping over of V-plow 100 and/or in the replacement of cleaning elements 110 thereon, may be headed drive pins that have transverse locking clips to retain them in position on V-plow 100.

While substantial vertical symmetry of certain aspects of V-plow 100 and of cleaning media 110 therefor is desirable, symmetry is not necessary for a V-plow 100 to be flip-able. A V-plow 100 may have less than substantial symmetry, e.g., where a cleaning media 110 is provided that is not symmetrical, or where non-reversible cleaning media are employed, nevertheless the pivotable power arms 160 and V-plow frame 120, 140, 140 remain flip-able.

To avoid interference by rear support bar 140 that might limit the pivoting of front power arm 160 from one side of V-plow 100 to the other when V-plow 100 is flipped over, which may be the case for V-plows intended for use on relatively narrow conveyor belts, rear support bar may be curved toward the rear or may have a notch on the forward edge thereof, rather than being straight as illustrated, so as to provide greater clearance, thereby allowing power arm 160 to pivot more easily from one side of V-plow 100 to the other side thereof. Further, front power arm 160 itself and/or other power arms 160 may have a pivotable connection along its length so that at least front power arm 160 is pivotable to have a shorter length configuration for being pivoted past rear support bar 140, e.g., from one side of V-plow 100 to the other side thereof.

Each of the U.S. Provisional Applications, U.S. Patent Applications, and/or U.S. Patents identified herein are hereby incorporated herein by reference in their entirety, for any purpose and for all purposes irrespective of how it may be referred to herein.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. A flip-able V-plow belt cleaner usable with cleaning media that have opposing cleaning edges in both directions away from their mounting interface, said V-plow belt cleaner comprising:
   left and right arms joined together at forward ends thereof to define an apex, each arm providing a mounting interface for receiving cleaning media thereat;
   a front arm holder attached to said arms proximate the apex, said arm holder having a transverse hole;
   a rear support bar attached proximate rearward ends of said left and right arms for maintaining a spacing between the rearward ends of said left and right arms;
   one or more rear arm holders attached to said rear support bar intermediate the ends thereof; and
   two or more power arms for connecting to a V-plow mount, each power arm being pivotably connected to one of said front and rear arm holders and being disposable to positions both above and below a plane defined by said left and right arms and said rear support bar; and
   whereby said V-plow belt cleaner may be connected to a V-plow mount with said power arms disposed to one side of the plane defined by said left and right arms and said rear support bar and may be flipped over and attached to the V-plow mount with said power arms disposed to the other side of the plane defined by said left and right arms and said rear support bar, said V-plow belt cleaner thereby being usable in either orientation.

2. The V-plow belt cleaner of claim 1 further comprising one or more cleaning elements mounted to said left and right arms, wherein said one or more cleaning elements have first and second opposing cleaning edges that are respectively above and below said arms, whereby when the first cleaning edge becomes worn, said V-plow belt cleaner may be flipped over for using the second cleaning edge.

3. The V-plow belt cleaner of claim 1 wherein said left and right arms are connected to a front nose plate to define the apex.

4. The V-plow belt cleaner of claim 3 wherein said front arm holder is attached to said front nose plate.

5. The V-plow belt cleaner of claim 1 wherein each of said front and rear arm holders has a transverse hole aligned with a transverse hole of an associated one of said power arms, further comprising a fastener through the aligned holes of associated power arms and arm holders for providing the pivotable connection.

6. The V-plow belt cleaner of claim 1 wherein each power arm is pivotable to positions both above and below the plane defined by said left and right arms and said rear support bar.

7. The V-plow belt cleaner of claim 1 further comprising a V-plow mount including front and rear mounting tubes, wherein one of said two or more power arms is connected to said front mounting tube and is referred to as a front power arm and another one of said two or more power arms is connected to said rear mounting tube and is referred to as a rear power arm.

8. The V-plow belt cleaner of claim 7 wherein said front and rear power arms are pivotable on said front and rear mounting tubes or wherein said front and rear mounting tubes are rotatable.

9. The V-plow belt cleaner of claim 7 wherein said front and rear mounting tubes are mounted transversely to a conveyor belt with said V-plow belt cleaner against the conveyor belt with the apex of said V-plow belt cleaner facing the direction of belt travel for removing material from the conveyor belt.

10. A flip-able V-plow belt cleaner usable with cleaning media that have opposing cleaning edges in both directions away from their mounting interface, said V-plow belt cleaner comprising:
   left and right arms joined together at forward ends thereof to define an apex, each arm providing a mounting interface for receiving cleaning media thereat;
   a rear support bar attached proximate rearward ends of said left and right arms for maintaining a spacing between the rearward ends of said left and right arms;
   two or more power arms for connecting to a V-plow mount, one power arm being pivotably connected to said left and right arms proximate the apex and one or more of said power arms being pivotably connected to said rear support bar, said power arms being disposable to positions both above and below a plane defined by said left and right arms;
   one or more cleaning elements mounted to said left and right arms, wherein said one or more cleaning elements have first and second opposing cleaning edges that are respectively above and below said arms, whereby when the first cleaning edge becomes worn, said V-plow belt cleaner may be flipped over for using the second cleaning edge; and whereby said V-plow belt cleaner may be connected to a V-plow mount with said power arms disposed to one side of the plane defined by said left and right arms and may be flipped over and attached to the V-plow mount with said power arms disposed to the other side of the plane defined by said left and right arms, said V-plow belt cleaner thereby being usable in either orientation.

11. The V-plow belt cleaner of claim 10 wherein said left and right arms are connected to a front nose plate to define the apex.

12. The V-plow belt cleaner of claim 11 further comprising a front arm holder attached to said front nose plate for providing said pivotable connection to said one power arm.

13. The V-plow belt cleaner of claim 10 including a front arm holder connected proximate the apex and one or more rear arm holders connected to said rear support bar, wherein each of said front and rear arm holders has a transverse hole aligned with a transverse hole of an associated one of said power arms, further comprising a fastener through the aligned holes of associated power arms and arm holders for providing the pivotable connection.

14. The V-plow belt cleaner of claim 10 wherein each power arm is pivotable to positions both above and below the plane defined by said left and right arms.

15. The V-plow belt cleaner of claim 10 further comprising a V-plow mount including front and rear mounting tubes, wherein said front power arm is connected to said front mounting tube and said one or more rear power arms are connected to said rear mounting tube.

16. The V-plow belt cleaner of claim 15 wherein said front and rear power arms are pivotable on said front and rear mounting tubes or wherein said front and rear mounting tubes are rotatable.

17. The V-plow belt cleaner of claim 15 wherein said front and rear mounting tubes are mounted transversely to a conveyor belt with said V-plow belt cleaner against the conveyor belt with the apex of said V-plow belt cleaner facing the direction of belt travel for removing material from the conveyor belt.

* * * * *